United States Patent [19]
Kaiser, II

[11] Patent Number: 5,480,170
[45] Date of Patent: Jan. 2, 1996

[54] COOLER CADDY, AND METHODS OF CONSTRUCTING AND UTILIZING SAME

[76] Inventor: Ronald R. Kaiser, II, 12060 Cavell, Livonia, Mich. 48150

[21] Appl. No.: 222,395

[22] Filed: Apr. 1, 1994

Related U.S. Application Data

[63] Continuation-in-part of Ser. No. 709,208, Jun. 3, 1991, Pat. No. 5,306,029.

[51] Int. Cl.$^6$ ...................................................... B62B 3/02
[52] U.S. Cl. ........................... 280/30; 108/80; 280/47.34; 296/22; 312/351.3
[58] Field of Search .................. 108/144, 80; 312/351.3; 296/22; 280/43.14, 651, 47.34, 47.35, 30, 37, 47.371, 79.2

[56] References Cited

U.S. PATENT DOCUMENTS

| | | |
|---|---|---|
| 522,058 | 6/1894 | Hiett et al. . |
| 1,455,395 | 5/1994 | Exum . |
| 1,964,805 | 7/1934 | Barnes . |
| 2,575,537 | 11/1951 | Trunfio .......................... 312/351.3 X |
| 2,603,500 | 7/1952 | Messier . |
| 2,604,333 | 7/1952 | Elmer . |
| 3,266,813 | 8/1966 | Bosko et al. . |
| 3,373,993 | 3/1968 | Oja et al. ......................... 280/43.14 X |
| 3,873,114 | 3/1975 | Brown . |
| 3,889,967 | 6/1975 | Sauer . |
| 3,904,175 | 2/1976 | Robison . |
| 3,944,241 | 3/1976 | Epelbaum . |
| 4,009,762 | 3/1977 | Bjerkgard . |
| 4,066,023 | 1/1978 | Hughes . |
| 4,706,817 | 11/1987 | Greathouse . |
| 4,762,331 | 8/1988 | Tucker et al. . |
| 4,796,909 | 1/1989 | Kirkendall . |
| 4,846,493 | 7/1989 | Mason . |
| 4,887,836 | 12/1989 | Simjian . |
| 5,056,878 | 10/1991 | Givens ................................. 312/351.3 |

*Primary Examiner*—Margaret A. Focarino
*Assistant Examiner*—Michael Mar
*Attorney, Agent, or Firm*—Weiner, Carrier & Burt; Joseph P. Carrier; Irving M. Weiner

[57] ABSTRACT

A device for transporting food and food related items including an insulated container having foldable all-terrain wheels, foldable tray members, and telescoping handle. Tie-down hooks are provided to permit securement of a saddlebag to the device. The saddlebag will provide increased transporting capacity. The tray members may be locked into a horizontal use position to support plated, beverages, food containers, etc. An auxiliary support pole may be attached to the container to support an umbrella or light.

20 Claims, 8 Drawing Sheets

COOLER CADDY, AND METHODS OF CONSTRUCTING AND UTILIZING SAME

This application is a continuation-in-part application of U.S. Ser. No. 709,208, filed Jun. 3, 1991, now U.S. Pat. No. 5,306,029.

BACKGROUND OF THE INVENTION

1. Field of the Invention

The present invention relates to a device for transporting items such as food and utensils to outdoor events such as picnics, sporting events, etc. and providing a dining surface. More particularly, the invention relates to a compact, mobile insulated container or caddy having associated therewith tray members which form a table-like structure when in their use position, and a telescopic umbrella which may be selectively extended and opened above the table-like structure. The container includes, hingedly mounted thereon, all-terrain wheels and a handle for ease of movement of the caddy to the outdoor event. The container provides a carrying capacity for items such as beverages, foods and utensils. The container includes on its outer sides, tie hoods for securing a saddlebag to the device to increase the device's carrying capacity, and a plurality of retractable legs which selectively elevate the device to a desired height and stabilize the cooler structure at a desired location.

2. Description of the Relevant Art

It has become increasingly popular to picnic in places where a table or other support surfaces are not available. Typically, a cooler or other container is carried to the desired location. This can be very exhausting if the desired location is inconvenient to roads or other means of transportation.

U.S. Pat. No. 2,603,500 to Messier discloses a cart having wheels and handle, the cart having side "shelves" for horizontal eating surfaces. The cart includes an insulated container. However, this cart design would not be easily transported through loose dirt or sand.

U.S. Pat. No. 4,796,909 to Kirkendall discloses a cart which may support an ice chest. A storage pack may be secured over the ice chest. The wheels may be folded for storage. The cart adjusts in length to accommodate various sized loads.

U.S. Pat. No. 4,706,817 to Greathouse discloses a cart including a compartment, a folding shelf and folding wheels.

U.S. Pat. No. 4,887,836 to Simjian discloses a collapsible cart adapted to be stored in an automobile cart.

U.S. Pat. No. 3,944,241 to Epelbaum discloses a dual purpose device having folding wheels and telescopic handles.

U.S. Pat. No. 3,873,114 to Brown discloses a portable insulated container having platforms which pivotally engage with the container. Brown fails to disclose a device having retractable wheels having shock absorbing means, means for easily lifting the container, or means for adjusting the height thereof relative to a ground surface.

U.S. Pat. No. 3,266,813 to Bosko discloses a portable refuse cart, but fails to disclose a portable insulated container having tray means for providing a dining surface, means for selectively adjusting the container to a desired height, wheels having shock absorbing means, or means for retracting its wheel assembly into a collapsed position for convenient storage.

U.S. Pat. No. 4,009,762 to Bjerkgard discloses a ladder-carrier combination having detachable wheels, but fails to disclose an insulated container having trays pivotally connected thereto, retractable wheels having shock absorbing means, or means for selectively adjusting the trays to the desired elevation relative to a ground surface.

U.S. Pat. No. 4,762,331 to Tucker discloses an automobile seat/stroller combination having retractable wheels, each of which pivots about a vertical axis. Tucker fails to disclose a portable container having an insulating means, dining surface means, wheels having shock absorbing means, and means for selectively adjusting the dining surface to a desired elevation relative to a ground surface.

U.S. Pat. No. 4,066,023 to Hughes discloses a portable copy machine table having trays pivotally connected to a top surface thereof, but fails to disclose a portable insulating container having trays pivotally connect to a top surface thereof so as to provide a dining surface, means for selectively adjusting the dining surface height, preformed handles for lifting the container, or retractable wheels having shock absorbing means.

U.S. Pat. No. 4,846,493 to Mason discloses a portable cooler having retractable wheels, but fails to provide tray means pivotally connected to a top surface thereof, means for selectively elevating the top surface relative to a ground surface, wheels which individually pivot about substantially vertical axes having shock absorbing means, or means for supporting and storing multipurpose pole members.

U.S. Pat. No. 1,455,395 to Exum discloses a portable serving table having a storage container, trays pivotally connected thereto, and a handle for pushing the container. Exum fails to provide a portable insulated container having trays pivotally connected thereto so as to form a dining surface area, trays having means for automatically locking the trays into a usable position, retractable wheels having shock absorbing means, or means for adjusting the dining surface to a desired height.

U.S. Pat. No. 2,604,333 to Elmer discloses a portable bassinet/stroller/playpen combination, but fails to disclose a portable insulated container with trays pivotally connected thereto so as to form a dining surface, means for selectively elevating the dining surface, or wheels having shock absorbing means.

U.S. Pat. No. 3,940,175 to Robison discloses a multipurpose trailer/picnic table combination, but fails to provide a compact, insulated container having retractable wheels with shock absorbing means, or means for elevating the trays to a desired substantially horizontal surface.

Each of the above-mentioned devices fails to disclose or teach the structure and advantages of the caddy device of the present invention, and otherwise fails to satisfy a need in the art for a versatile, durable, compact and transportable cooler/table structure which can be manufactured relatively inexpensively.

SUMMARY OF THE INVENTION

The present invention provides a combined cooler and table structure for transporting food and food related accessories, and for conveniently supporting the food for consumption in a dining environment. The invention includes an insulated container for storing foods and related items; tray members hingedly secured on each side of the container to form eating surfaces for several individuals and which are individually positionable in storage and operative positions; all-terrain wheels, connected to a bottom of the container, which pivot between a lower, in-use position and an upper storage position; and retractable legs attached to the insulated container to adjustably position and support the eating surface at the desired height.

In a preferred embodiment, the container further includes tray support means, a telescopic handle and accessory pole supports. The tray support means is adapted to selectively lock each of the trays into a horizontal use position. The telescopic handle is pivotally secured to the device to permit a convenient motive force, and the accessory support pole preferably but not necessarily has a light or umbrella fixed to one end thereof such that it can be selectively disposed over the eating surface. The support pole is securable in a vertical position on the container and telescopes to an extended position.

It is an object of the present invention to provide a device which conveniently transports food items, such as picnic food, over all types of terrain.

It is a further object of the present invention to provide such a device which includes an insulated container and several eating surfaces associated with the container.

It is another object of the present invention to provide such a device which may be compactly disposed for storage and transportation.

It is an even further object of the present invention to provide a saddlebag which selectively attaches to the device for increasing carrying capacity.

The above and further objects, details and advantages of the invention will become apparent from the following detailed description, when read in conjunction with the accompanying drawing.

DETAILED DESCRIPTION OF THE PREFERRED EMBODIMENT

Figure 1:
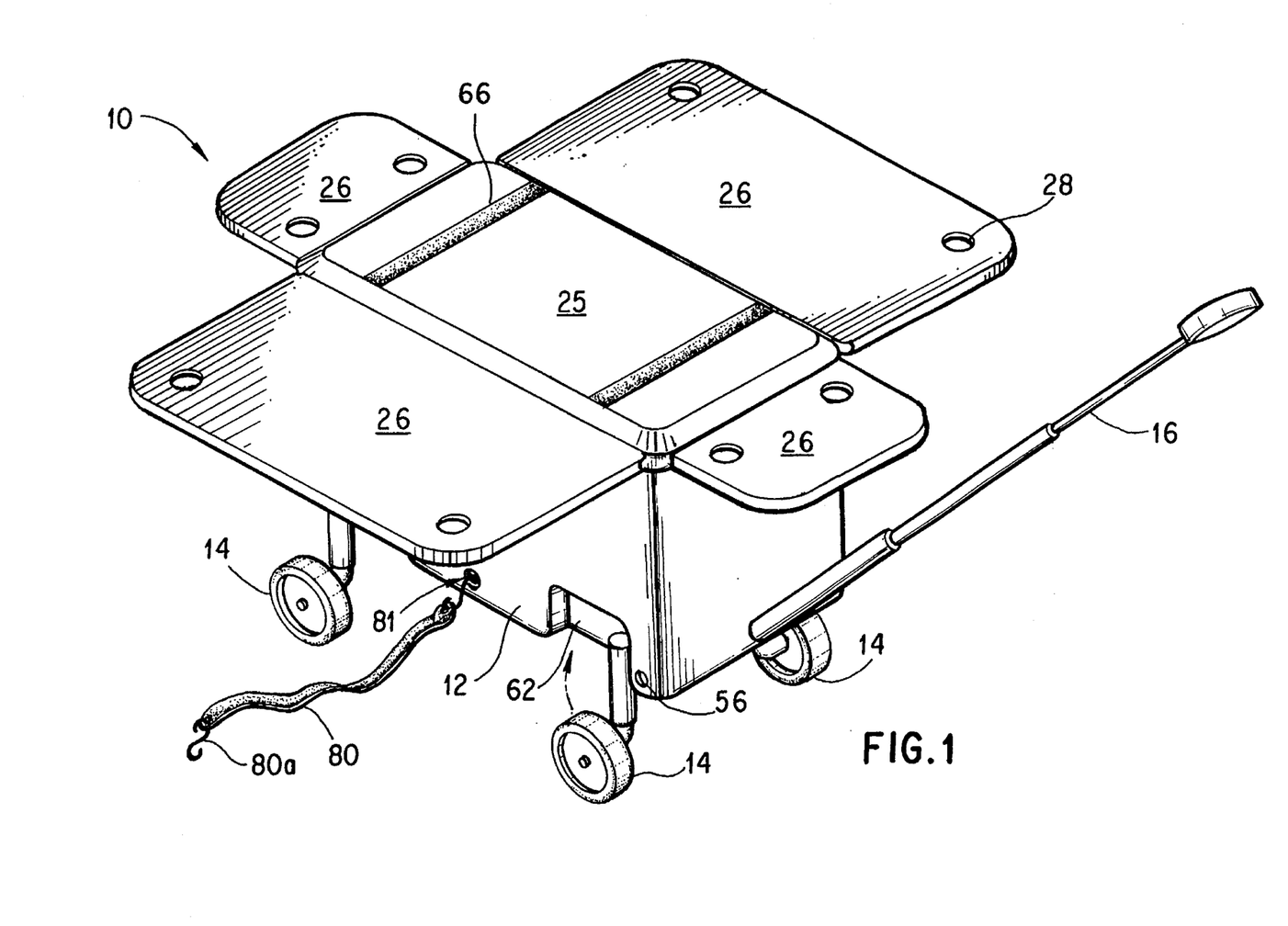
FIG. 1 illustrates a perspective view of a mobile insulated container in accordance with a preferred embodiment of the present invention, the container being shown in an extended disposition thereof.

Referring now to the drawings and more particularly to FIG. 1 thereof, a portable insulated caddy device 10 is shown. The device 10 comprises a container portion 12 which is easily transported upon wheels 14. Motive force is provided via telescoping and folding handle 16.

Figures 2, 2A, 3:
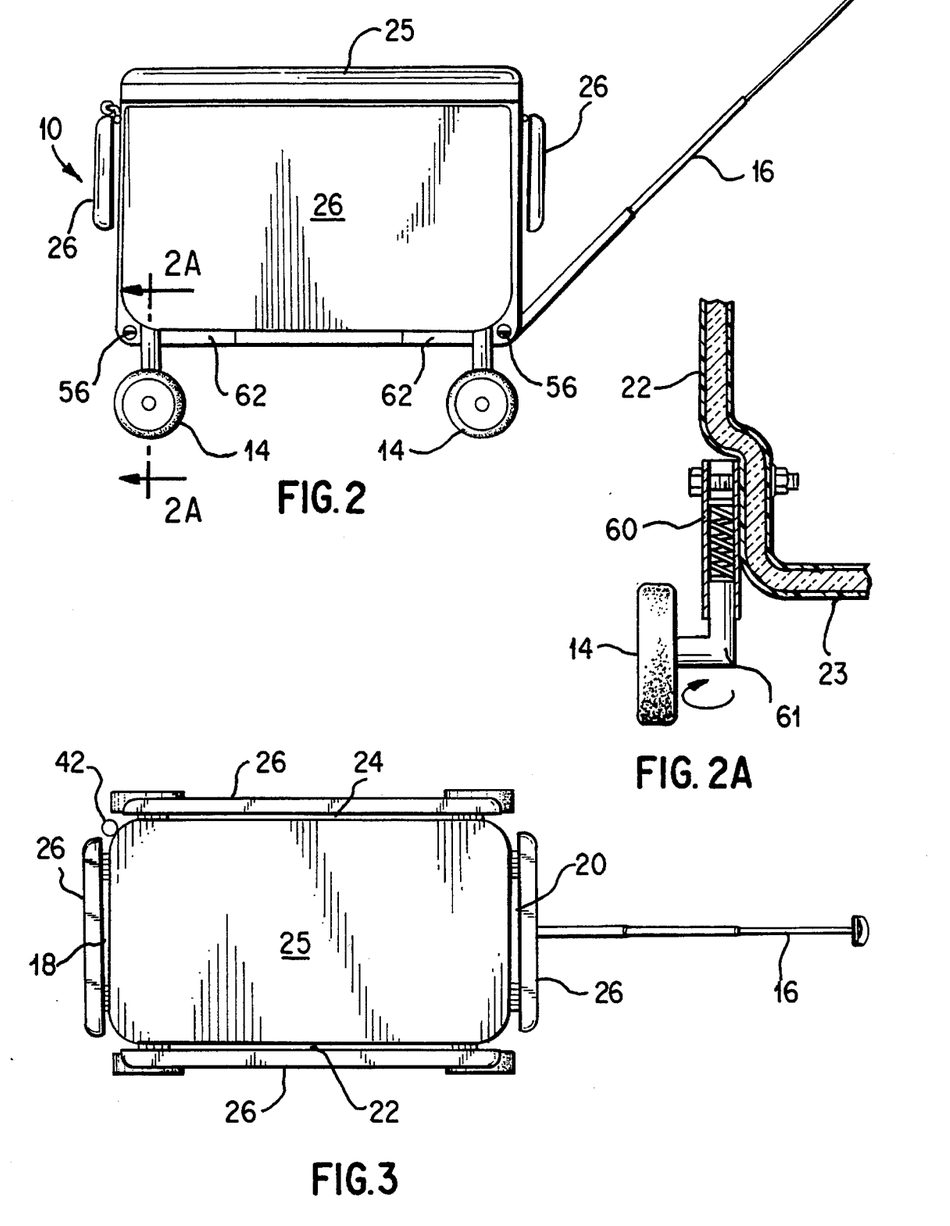
FIG. 2 illustrates a side view of the mobile insulated container of FIG. 1, but in which trays of the device are shown in a storage disposition thereof.
FIG. 2A illustrates a cross-section taken along line 2A—2A shown in FIG. 2.
FIG. 3 illustrates a top view of the device in FIG. 2.

As best seen in FIG. 3, the container portion 12 includes first and second end walls 18, 20, a pair of side walls 22, 24 a bottom 23 and a removable top member 25, which are preferably but not necessarily shaped to form a substantially box shape. Preferably, the walls 18, 20, 22, 24, bottom wall 23, and top 25 are insulated to retain cold or heat in the container, to keep foodstuffs which may be held in the container 10 from spoiling. Generally, this includes double-wall construction as shown in FIG. 2A. Hingedly secured to each sidewall is a tray means 26 movable between a horizontal use position and a vertical storage position (as seen in FIGS. 1 and 2). Tray means 26 cooperate with top member 25 to provide an eating surface when the tray means are in the horizontal use position, and extend substantially against the walls 18, 20, 22, and 24 of container 12 when in the vertical storage position.

In the preferred embodiment, each tray means 26 preferably but not necessarily substantially extends the width of its corresponding wall to which it is adjacent (FIGS. 1-8), but alternatively the width of each tray means 26 is smaller than the width of its corresponding wall and each such wall includes a recess shaped so as to substantially receive the tray means 26. In this way, when tray means 26 are in their vertical storage position, a smooth and continuous surface is formed with container 12 so that the device substantially assumes the appearance of a conventional cooler.

The tray means 26 preferably include molded therein detent means 28 for retaining beverage container.

The container 12 is preferably constructed as one piece and sized to hold a relatively large quantity, such as 36 quarts. The caddy device is preferably but not necessarily constructed from molded plastic in order to provide an inexpensive, sturdy, and lightweight device.

Figure 6:
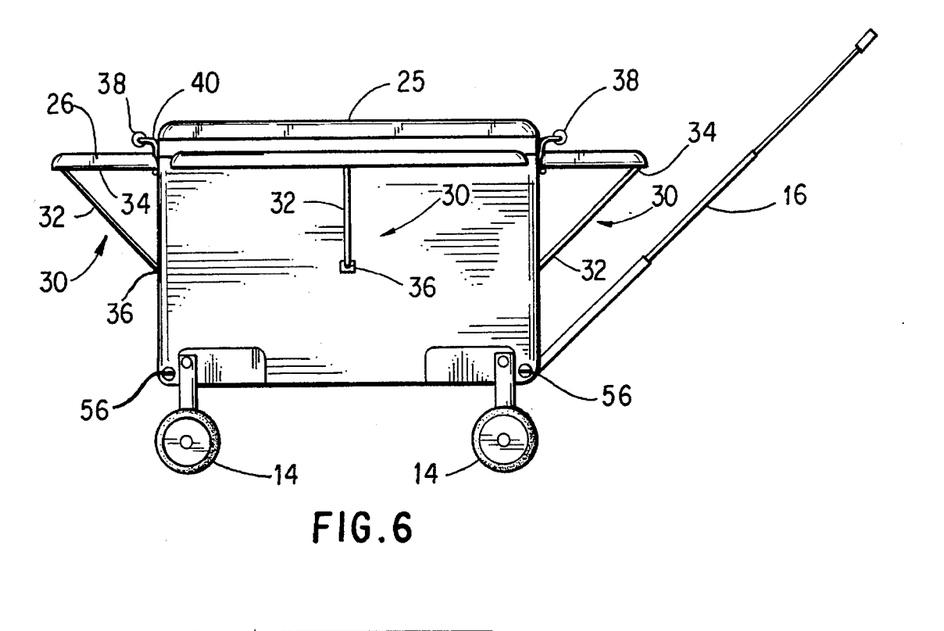
FIG. 6 illustrates a side view of the device similar to FIG. 2, but with the tray means in the horizontal use position and including an auxiliary handle means.
Figure 6A:
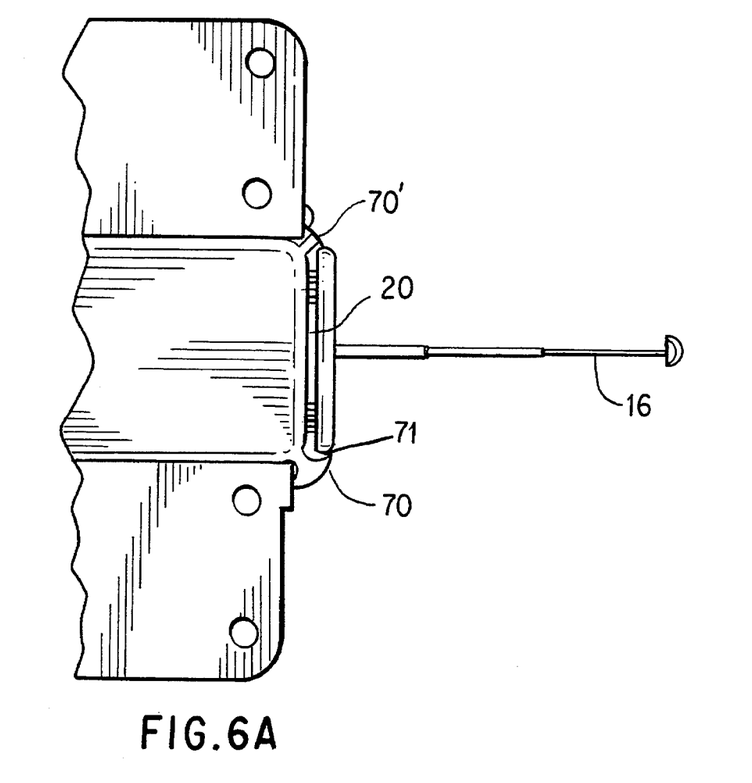
FIG. 6A illustrates a partial top plan view of a device having a modified means for supporting the tray means in the horizontal use positions thereof.

As best seen in FIG. 6A, the caddy device 10 may include corner extensions 70 for extending the corners of the side walls outward to provide the appearance of a one-piece molded device when trays 26 are in the horizontal use position. Essentially, extensions 70 form recesses into which the tray means 26 fit.

When in the horizontal use position, tray means 26 preferably but not necessarily are substantially planar with top member 25, but alternatively tray means 26 form a substantially horizontal plane below top member 25. As shown in FIG. 1, top member 25 and trays 26 preferably but not necessarily include edges having substantially concave and correspondingly convex edges so that when trays 26 are in the horizontal use position, a substantially smooth and continuous surface is formed therebetween.

The present invention preferably but not necessarily includes means for stably holding trays 26 substantially against container portion 12 when in the vertical non-use position. Referring to FIG. 1, such holding means preferably but not necessarily includes at least one elastic bungee-type cord 80, having hooks 80a attached to either end thereof; and a recess defined in a lower portion of the walls of container 12, having a post 81 secured along the inner surface thereof and adapted for engagement with a hook 80a of cord 80.

In use, when trays 26 are placed in the vertical non-use position, a first hook 80a engages with a post 81 located in a first wall of container 12, and cord 80 is wrapped over top member 25 and down the opposite wall of container 12 so that the second hook 80a of cord 80 engages with post 81 thereof, thereby holding the associated trays 26 substantially against container 12. Further, a second cord 80 is used to similarly hold the remaining two trays 26 substantially against container 12.

In addition, the corner extensions may provide a friction catch 71 to secure the tray means 26 in the non-use position. Alternatively, other known catch means such as complementary VELCRO® hook and loop fasteners may be provided to hold the tray means 26 in the down, non-use position. The corner extension 70 (FIG. 6A) would be provided if a catch means such as VELCRO® hook and loop fasteners were to be employed to secure the tray means 26 to the container 12.

As best seen in FIG. 6, a support means or prop 30 is provided to lock each tray means 26 in the horizontal use position. Support means 30 comprises a rigid support member 32 hingedly secured to each tray means at a first end 34 thereof. The second end of the rigid member 32 is adapted to fit into a detent 36 in the sidewall of container 12. Optionally, a slot may be provided in the underside of each tray means into which the rigid member 32 fits when each tray means is folded down to the storage position. When each tray means 26 is locked in the horizontal use position by support means 30, the upper surface of each tray means 26 is level with the upper surface of top member 25 to form a table-like surface.

Figure 6B:
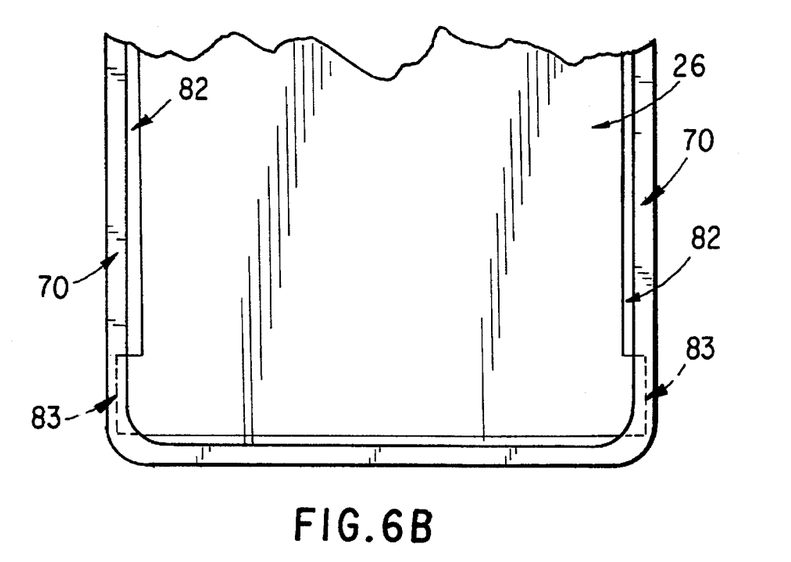
FIG. 6B illustrates a side elevational view of the device showing the means for sliding the tray means therealong.

Instead of pivotally connecting tray means 26 to container 12 using conventional hinges, device 10 alternatively includes a second means for moving trays 26 to and from the horizontal use position. As shown in FIGS. 6A and 6B, such second moving means preferably but not necessarily comprises a plurality of tracks or slots 82 substantially vertically attached to or formed integrally with extension 70 of container 12, at least one per wall, along which each tray 26 is adapted to be slidably positioned substantially vertically. Connecting member 83 extends from tray 26 so as to engage with slot 82.

In this embodiment, when tray 26 is in the vertical non-use position, connecting member 83 slidably engages with slot 82 so that tray 26 may be slid upwardly substantially vertically relative to container 12 until connecting member 83 engages with the upper end of track 82 so as to form a hinge connection therewith, at which point tray 26 may be pivoted about container 12 and into the horizontal use position. In an alternative embodiment, connecting member 83 is comprised of a plurality of members 83a, each of which extends outwardly from a side of tray 26, with one such member 83a adapted to form a hinge connection with track 82 in order to allow tray 26 to pivot into the horizontal use position. Support posts 32 may additionally be used to hold tray 26 in the horizontal position.

Figure 7:
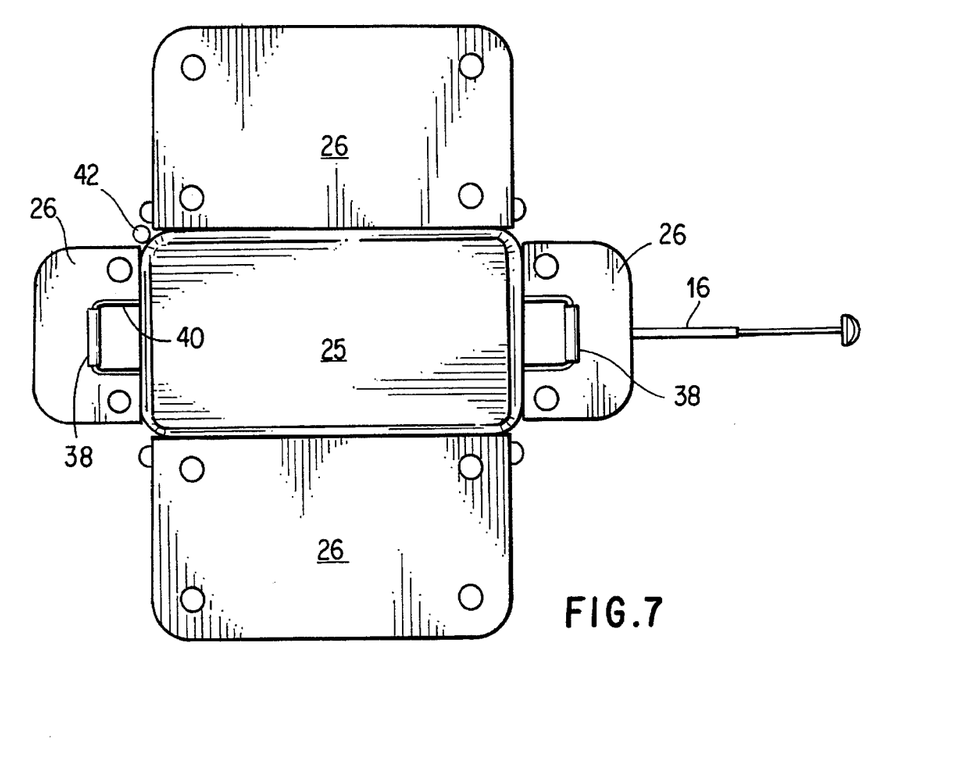
FIG. 7 illustrates a top view of the device shown in FIG. 6.
Figure 8:
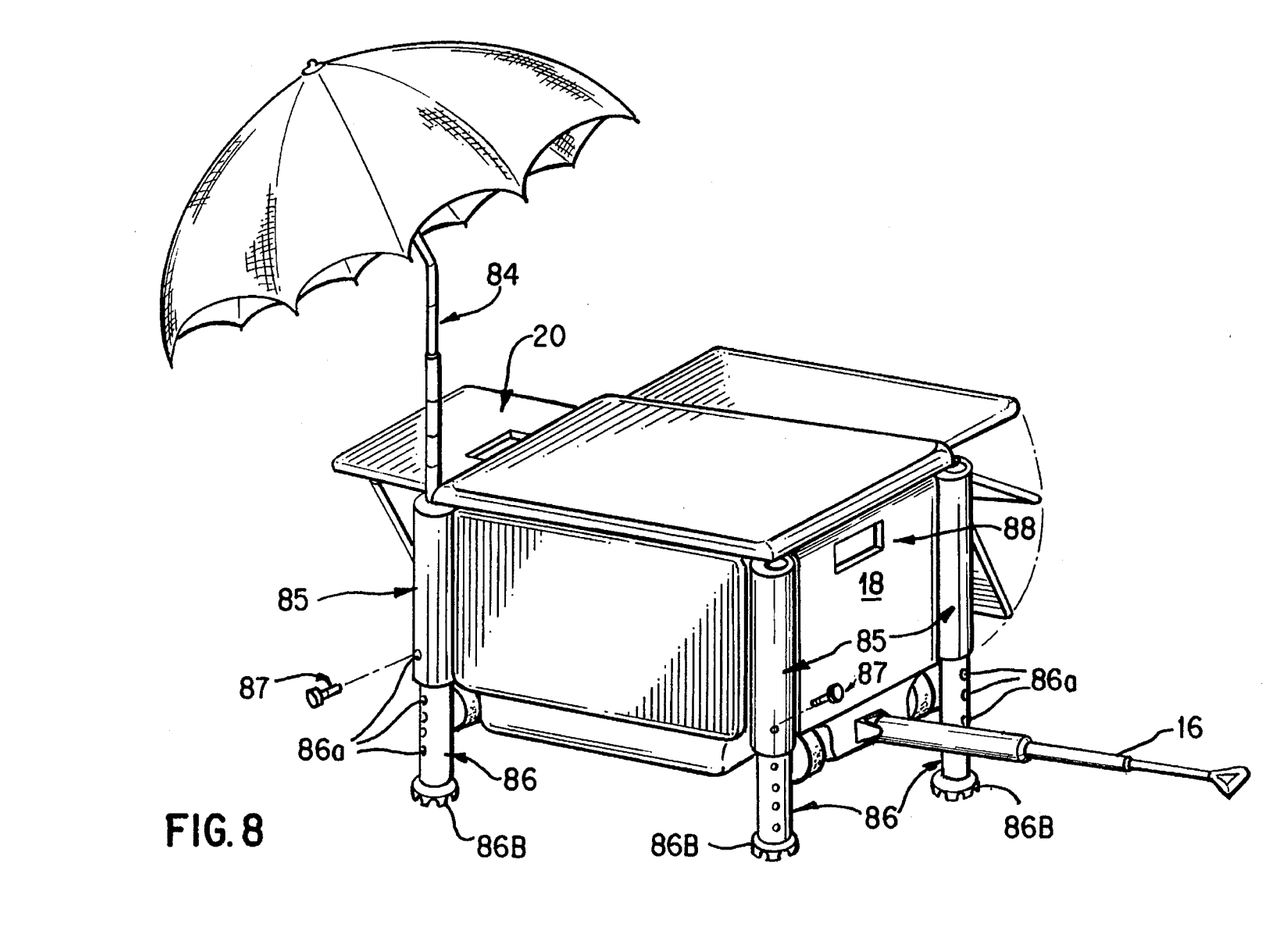
FIG. 8 illustrates a perspective view of a mobile insulated container in accordance with a second preferred embodiment of the present invention.

As shown in FIG. 8, device 10 is moved by using either telescoping handle 16 or preformed aperture handles 88. Telescoping handle 16 is used to propel the device 10 when wheels 14 are in the downward position. As is well known, "telescoping" refers to the sections which slide or pass within another. The telescopic handle 16 has several sections which slide within one another. The handle 16 is additionally hingedly secured to the container 12 to accommodate users of various heights and to permit the handle 16 to be stored. Preformed aperture handles 88 are preferably but not necessarily defined laterally through trays 26 situated on outer walls 18, 20 of container 12 in order to allow device 10 to be lifted and carried when in the non-use position. Alternatively, extendable handles 38 are comprised of flexible members 40 having a rigid handle 38 secured thereto, the flexible member 40 allowing the handle 38 to be moved from beneath the tray means 26 for use (FIGS. 6 and 7).

At least three wheels 14 hingedly are pivotally attached to the container 12 through a shock absorber 60 (FIG. 2A) to permit the wheels 14 to move from an extended position wherein the wheels touch the ground, and a storage position, wherein the wheels are pivoted rotationally upwardly to provide easy storage of the device 10. Shock absorber 60 includes tubular member 60a, in which biasing means 60b is disposed to absorb shocks encountered from wheels 14 and posts 61 when traveling over uneven terrain.

Preferably, four such wheels 14 are provided on container 12, the wheels 14 may pivot underneath the container 12 or upward adjacent the tray means 26 as shown by the dotted lines in FIG. 1. In addition, for increased maneuverability, the wheels pivot around post 61 to aid in turning the caddy 10. Recesses 62 may be provided on the side or bottom to accommodate the wheels 14. When wheels 14 are in the extended position, the top member 25 is at one height at which a seated individual would be comfortable eating from the tray means 26. Preferably, wheels 14 are "all-terrain" wheels which permit travel across sand, rocks, etc.

In an alternative embodiment, wheels 14 each remains in an operable position and pivots about a substantially vertical axis defined by post 61 (FIGS. 2A and 8).

The present invention preferably but not necessarily includes a means for supporting a plurality of elongated, telescopically-adjustable articles 84. Referring to FIG. 8, such supporting means comprises elongated tubing 85, which are preferably but not necessarily attached to each outer edge of container 12 and adapted to receive telescopically-adjustable articles 84, such as umbrella or lighting poles or a combination of poles which support a canopy or similar articles. Additionally, elongated articles 84 may be substantially disposed within tubing 85 for storage thereof when not in use.

Tubing 85 additionally preferably but not necessarily cooperates with a means for selectively elevating and locking container 12 at the desired height relative to the ground or surface on which it rests. Specifically, the elevating means comprises elongated legs 86, which preferably but not necessarily are adjustably slidably disposed within the lower end of tubing 85, as shown in FIG. 8. Legs 86 include a plurality of apertures 86A laterally disposed therethrough and in a longitudinally spaced relation to one another, and a lower portion of tubing 85 also includes an aperture extending laterally therethrough. A resilient pad 86B having a tread on a lower surface thereof is preferably but not necessarily attached to the exposed end of each leg 86.

Optionally, the lower portion of one or more tubing 85 is angled outwardly from its corresponding edge of container 12 so that when elevated, device 10 is more stably supported by legs 86.

Figure 9:
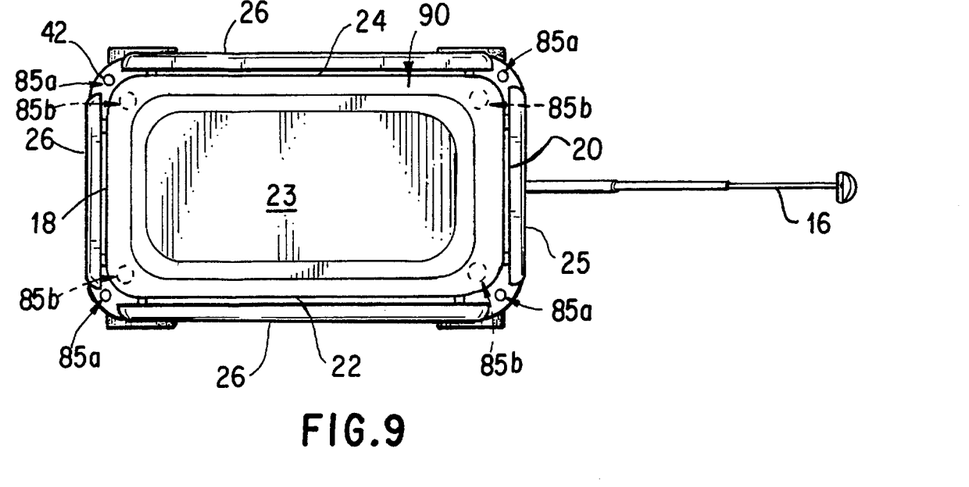
FIG. 9 illustrates a top elevational view of a third embodiment of the present invention.
Figure 10:
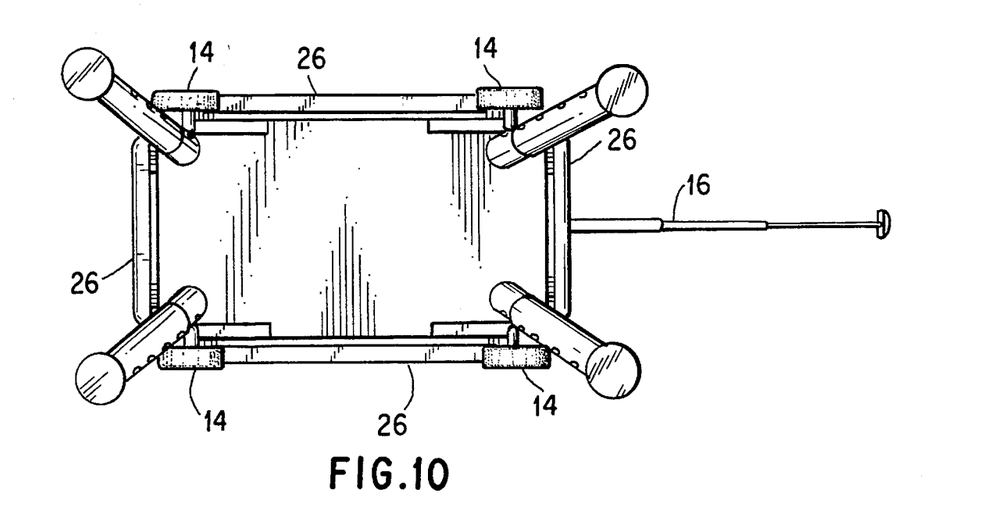
FIG. 10 illustrates a bottom elevational view of a third embodiment of the present invention.

In an alternative embodiment, tubing 85 is preferably but not necessarily located substantially within container 12. Further, in this embodiment tubing 85 is preferably but not necessarily comprised of separate tubing 85a and 85b for supporting telescoping articles 84 and for elevating container 12, respectively, as substantially shown in FIGS. 9 and 10, so that elevating tubing 85b angles outwardly from container 12 for improved stability when elevating container 12, while telescoping articles 84 extend substantially vertically therefrom. Referring to FIG. 9, container 12 includes a plate 90 which extends between storage area 91 of container 12 and the tray means 26, thereby covering the area in which tubing 85b is situated. As shown in FIG. 10, tubing 85b extends outwardly from bottom wall 23 so as to allow leg member 86 to be selectively locked into place relative thereto, but not to an extent wherein tubing 85b and leg members 86 interfere with its motion when being transported over a ground surface using handle 16.

In use, elongated legs 86 are retracted substantially within tubing 85 and locked in place using pin 87, so that device 10 can be transported or otherwise used in its unelevated position. If top member 25 is desired to be elevated to a certain height, such as for dining, each pin 87 is removed from each aperture of tubing 85, each leg 86 is partially slidably withdrawn therefrom, and pin 87 is reinserted in each aperture so as to mate with an aperture located on leg 86 that is in alignment therewith, thus locking leg 86 in place. This locking means provides for each leg to be individually adjustable so that top member 25 and trays 26 are capable of forming a substantially horizontal surface over uneven terrain.

Figure 11:
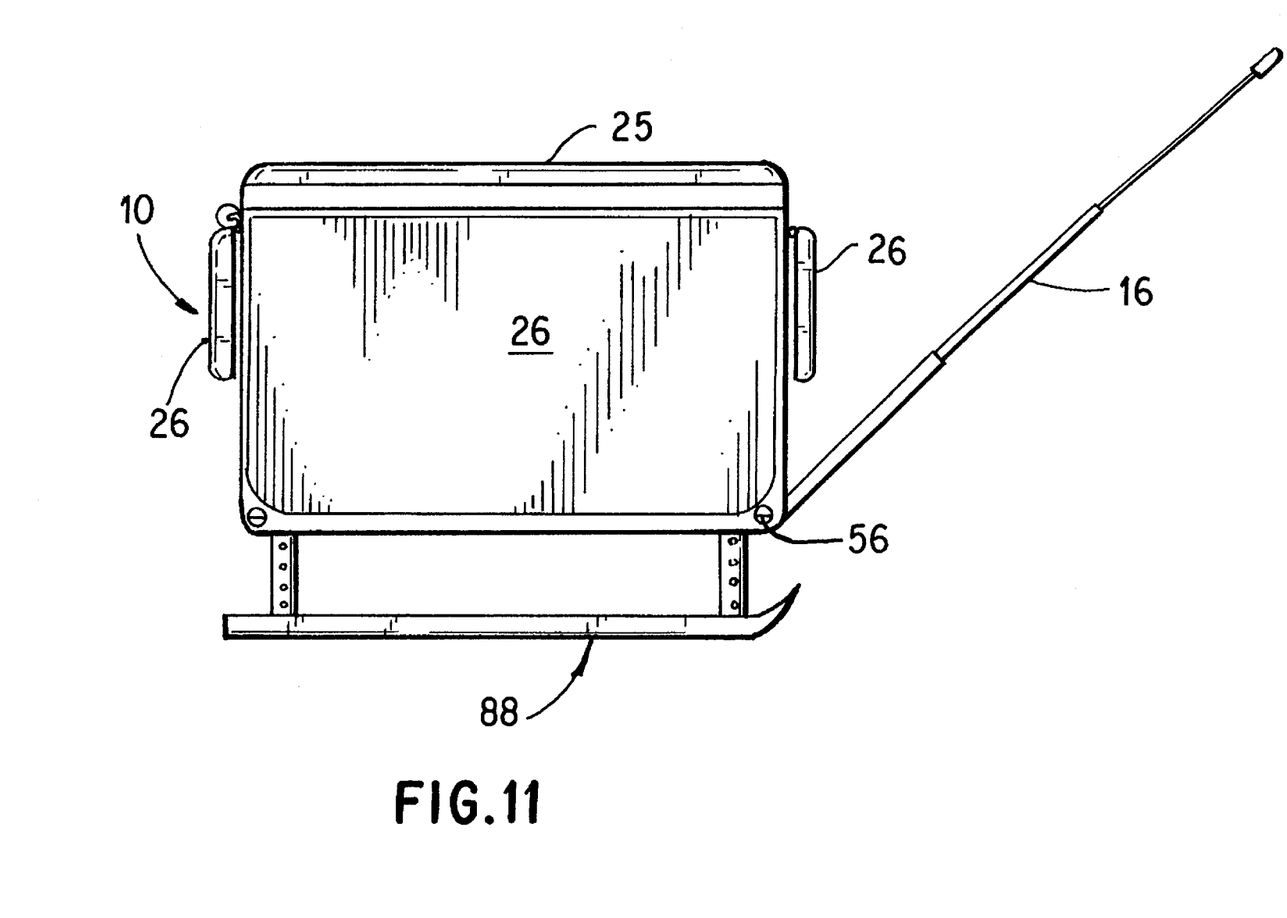
FIG. 11 illustrates a side elevational view of the device showing a sled attachment connected thereto.

Optionally, wheels 14 are detachable from posts 60 so that sled runners 88 may be selectively attached thereto for use on snow or similar surfaces, as shown in FIG. 11.

Figure 4:
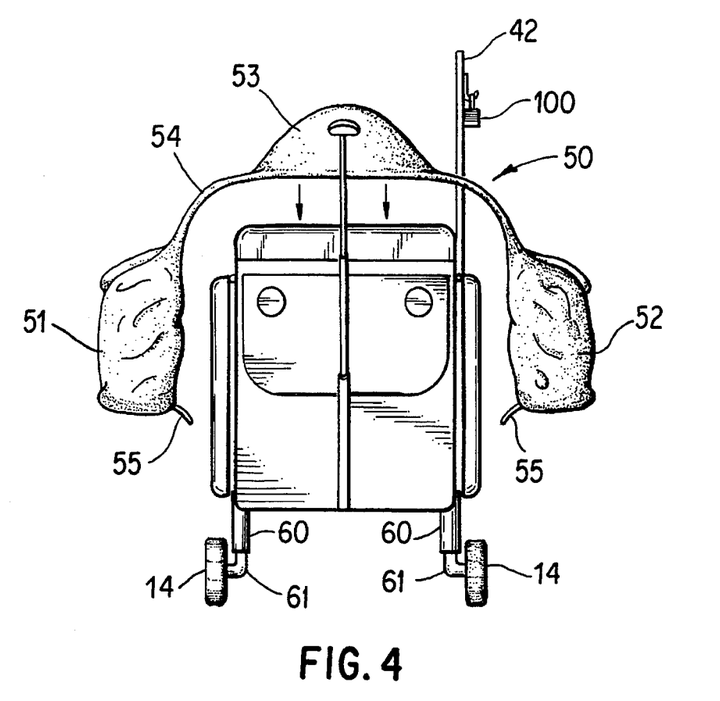
FIG. 4 illustrates a front view of the device in FIG. 2, but with accessories provided thereon.
Figure 5:
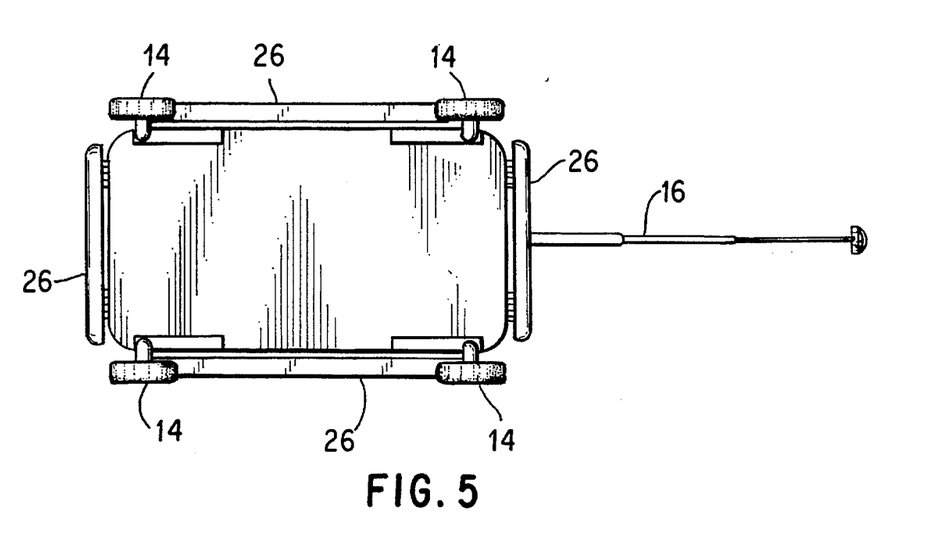
FIG. 5 illustrates a bottom view of a the device in FIG. 2.

Shown in FIG. 4 is a saddlebag 50 on caddy 10 which may be used to transport additional foodstuffs or accessories. Generally, the saddlebag 50 comprises a pair of bags 51, 52 joined together by a central portion 54. The central portion is sized to fit over the top member 25 to place bags 51, 52 on each side of the device 10. Optionally a third bag 53 may be provided on the central portion 54. Saddlebag 50 is secured to container 12 by attachment means 55 such as loops or catches on saddlebag 50 and corresponding attaching points 56 on the container 12. Bags 51, 52, 53 may be of type closed by a zipper or other similar closing means.

An additional saddlebag securement means 66 may be provided on the top member 25. Complementary strips of VELCRO® hook and loop fasteners would be provided on top 25 and on the underside of the central portion 54. This additional securement means 66 will prevent lateral shifting of the saddlebag 50.

Attaching point 56 may also be employed to secure items such as lawn chairs to the top member 25 by looping a rope or string across the top of the chair or other item and attaching the ends of the rope or string to the attaching points 56. The attaching points 56 preferably are constructed into the side of the container as an indentation with a central securement member extending across the indentation.

Although there have been described what are at present considered to be the preferred embodiments of the present invention, it will be understood that the invention can be embodied in other specific forms without departing from the spirit or essential characteristics thereof. The described embodiments are, therefore, to be considered in all aspects as illustrative, and not restrictive. The scope of the invention is indicated by the appended claims rather than by the foregoing description.

I claim:

1. A device for conveying food and food related objects, comprising:

an insulated container portion having four side walls, a bottom member, and a top member with a substantially horizontal surface;

at least one tray means hingedly secured to one of said side walls adapted to pivot between a substantially vertical position and a substantially horizontal position;

means for supporting said tray means in said substantially horizontal position;

means for holding said tray means in said substantially vertical position;

at least three wheels mounted to said container;

means, connected to said container, for adjustably elevating and stably supporting said container on a ground surface independently of said wheels;

said tray means being substantially planar with said horizontal surface of said top member when in said substantially horizontal position, said top member having corner extensions located proximate inner corners of said tray means, each corner extension having a recess for receiving and locking a respective inner corner of said tray means when the tray means is in the horizontal position;

said elevating means comprising a plurality of elongated tubing members attached to said container, a plurality of elongated leg members slidably disposed within lower ends of said tubing members, respectively, and means connectable to said tubing members and said leg members for selectively locking said leg members in a fixed position relative to said tubing members; and means, connected to said container, for selectively supporting a pole member in plural elevated positions thereof above said container and for storing the pole member in a contracted position thereof.

2. A device as recited in claim 1, wherein:

each of said leg members includes a plurality of apertures laterally defined therethrough and has a traction pad fixed to a lower end thereof;

each of said tubing members includes an aperture defined laterally therethrough; and said locking means includes a plurality of pins, one for each of said tubing members, adapted to selectively engage with said aperture of said tubing member and one of said apertures of said leg members aligned with said tubing member aperture.

3. A device as recited in claim 1, including:

a pole member for being supported and stored by said pole supporting and storing means;

said pole supporting and storing means selectively supports said pole in any of a plurality of positions around a periphery of said container; and said pole member being a telescoping pole member and having at least one of an umbrella and a hook on an upper end thereof.

4. A device as recited in claim 3, wherein:

each of said tubing members is attached to an outer edge of said container; and said pole supporting and storing means comprises upper ends of said tubing members such that said pole member substantially fits within the upper end of each said tubing member when said pole member is in its contracted position.

5. A device as recited in claim 1, wherein:

said tubing members are embedded substantially within said container, with said lower ends of said tubing members extending outwardly from said bottom of said container, and each of said leg members having a resilient traction pad fixed to a lower end thereof.

6. A device as recited in claim 1, wherein:

said container includes a plurality of recesses defined on lower portions of said side walls which are opposite each other, and a plurality of hook engaging members fixed within said recesses; and said holding means includes at least one elongated elastic cord having a hook attached to each end thereof, said hooks being adapted to selectively engage with said hook engaging members of said container and said cord being adapted to extend therebetween.

7. A device as recited in claim 1, wherein:

said corner extensions are shaped for providing a substantially continuous surface between said tray means and said top member when said tray means is in said substantially horizontal position, and between said tray means and said side walls of said container when in said substantially vertical position.

8. A device as recited in claim 7, wherein:

said container includes at least one track attached substantially vertically to at least one said side wall adjacent each said tray means when in said substantially vertical position; and each said tray means includes a first member operatively engaging with said track of said container so as to permit slidable movement of said tray means between said substantially vertical and said substantially horizontal positions along said track.

9. A device as recited in claim 1, wherein:

four tray means are connected to said container;

two of said tray means are attached to opposite side walls of said container and each includes an aperture defined therethrough so as to form a handle for carrying the container when said tray means are in the substantially vertical position thereof.

10. A device according to claim 1, including a plurality of said articles having a pole member, and said supporting and storing means may selectively support and store said plurality of articles simultaneously.

11. A device according to claim 1, wherein an upper surface of said pole supporting and storing means is substantially flush with said substantially horizontal surface of said top member.

12. A portable device for transporting items, comprising:

a container portion having four side walls, a bottom and a top member with a substantially horizontal surface;

at least one tray means hingedly secured to one of said side walls adapted to pivot between a substantially vertical position and a substantially horizontal position;

means for supporting said tray means in said substantially horizontal position;

means for holding said tray means in said substantially vertical position;

at least three wheels mounted to said container;

means, connected to said container, for selectively supporting at least one article having a pole member in an elevated position thereof above said container and for storing said article in a contracted position thereof;

said tray means being substantially planar with said substantially horizontal surface of said top member when in said substantially horizontal position, said top member having corner extensions located proximate inner corners of said tray means, each corner extension having a recess for receiving and locking a respective inner corner of said tray means when the tray means is in the horizontal position;

means connected to said container for adjustably elevating and stably supporting said container relative to a ground surface independently from said wheels;

said elevating means including a plurality of elongated tubular members, attached to said container, a plurality of elongated members adapted to telescopically engage within lower ends of said tubular members, respectively, and means for locking each of said leg members in a fixed position substantially within said tubular member; and said article supporting and storing means includes upper ends of said elongated tubular members, said upper ends being adapted to receive said pole member therein.

13. A device as recited in claim 12 wherein:

two tray means are secured to said sides of said container which are opposite each other;

said holding means includes at least one elastic cord having a hook attached to either end thereof so as to urge said tray means substantially against said wall of said container; and said holding means includes a plurality of recesses, located on a lower portion of each of said sides adjacent said tray means, and a plurality of posts, one per said recess, suspended within said recesses and adapted to selectively engage with said hooks of said cord so as to extend said cord over said tray means.

14. A device as recited in claim 12, wherein:

said tubular members each include an aperture defined laterally therethrough;

each of said leg members include a plurality of apertures defined laterally therethrough and in a spaced relation to each other; and said locking means includes a plurality of pin members, one per said tubular member, for selectively inserting through said aperture of said tubular members and said apertures of said leg members which are positionally aligned with said tubular member apertures.

15. A device as recited in claim 12, including:

the article having a pole member, said pole member is a substantially telescoping pole and fits substantially within the upper end of said tubular members when said pole is in a contracted position.

16. A device as recited in claim 12, wherein said container includes at least one track attached substantially vertically to at least one said side wall adjacent each said tray means when in said substantially vertical position; and each said tray means includes a first member operatively engaged with a corresponding track so as to permit slidable movement of said tray means between said substantially vertical and said substantially horizontal positions along said track.

17. A device according to claim 12, wherein said supporting and storing means may selectively support and store a plurality of articles having pole members simultaneously.

18. A device according to claim 17, wherein each of said articles includes one of an umbrella and a hook member provided on an upper end of said pole member.

19. A device according to claim 12, wherein an upper surface of said article supporting and storing means is substantially flush with said substantially horizontal surface of said top member.

20. A portable device for transporting food or related articles, comprising:

a means for storing articles in an insulated environment, having a front wall, a rear wall, two side walls, a bottom member, and a top member having a major flat surface;

a plurality of wheels pivotally mounted to said storage means;

means, connected to said storage means, for selectively elevating said storage means to any of a plurality of heights relative to a ground surface independently from said wheels;

a handle having a telescoping pole pivotally connected to said front wall for transporting said device;

said elevating means includes means to position said major flat surface of said top member in a substantially horizontal plane over uneven ground surfaces, and is adjustable between a use position in which said elevating means extend below said wheels, and a transport position in which said elevating means extend above said wheels;

a plurality of recesses formed within lower portions of said side walls, each recess corresponding to a respective one of said wheels;

said wheels being movable between a storage position and a transport position;

said wheels being retracted into said corresponding recesses in said storage positions thereof for easy storage of said device;

said wheels extending below said bottom member when in said transport position;

said wheels being mounted to said storage means through shock absorbing means; and tray means, including four trays, hingedly secured to said front, rear and side walls for extending said major flat surface of said top member, each tray being movable between a substantially vertical position and a substantially horizontal position, said top member having corner extensions located proximate inner corners of said tray means, each corner extension having a recess for receiving and locking a respective inner corner of said tray means when the tray means is in the horizontal position.

* * * * *